C. L. MOREHOUSE.
Shoe-Fastener.

No. 197,392.  Patented Nov. 20, 1877.

WITNESSES:
A. W. Almquist
J. H. Scarborough.

INVENTOR:
C. L. Morehouse.
BY Munn &Co
ATTORNEYS.

N. PETERS, PHOTO-LITHOGRAPHER, WASHINGTON, D. C.

UNITED STATES PATENT OFFICE.

CHARLES L. MOREHOUSE, OF CLEVELAND, OHIO, ASSIGNOR TO VIOLETTA MOREHOUSE, OF SAME PLACE.

IMPROVEMENT IN SHOE-FASTENERS.

Specification forming part of Letters Patent No. 197,392, dated November 20, 1877; application filed September 29, 1877.

*To all whom it may concern:*

Figure 1:
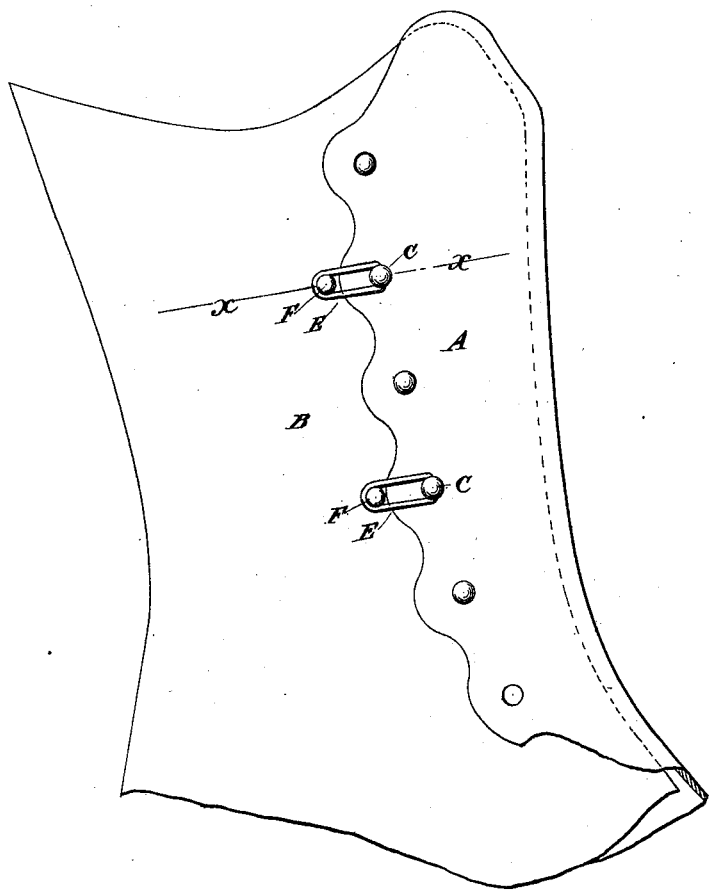
Figure 2:
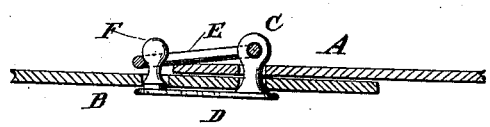

Be it known that I, CHARLES L. MOREHOUSE, of Cleveland, in the county of Cuyahoga and State of Ohio, have invented a new and useful Improvement in Fasteners for Shoes, &c., of which the following is a specification:

Figure 1 is a front view of a fastener, shown as applied to a shoe. Fig. 2 is a detail section of the same, taken through the line $x\ x$, Fig. 1.

Similar letters of reference indicate corresponding parts.

The object of this invention is to furnish an improved fastening for shoes, gloves, ladies' dresses, and various other uses, which shall be simple in construction, convenient in use, and reliable in operation, holding the parts to which it may be applied securely and smoothly in place.

The invention consists in the combination of the hinge-stud, the link, the catch-stud, and the plate or plates with each other, to adapt the device for use for fastening shoes, gloves, and other articles, as hereinafter fully described.

A represents the two overlapping parts of a shoe or other article that are to be secured together.

To the under part B, near its edge, is secured a stud, C, by being passed through a hole in said part B, and riveted to a base-plate or washer, D, placed upon the inner or outer side of said part B. The stud C may be made solid, with a hole through its upper end or head to receive the link E; or it may be struck up out of a straight strip of half-round or flat metal into U shape, and the arms closed together, forming an eye to receive the link E, and a stem to be passed through the part B and plate D, and riveted to said plate.

F is a stud, having a head formed upon its outer end, and having its inner end passed through a hole in the said part B, and through a hole in a plate, D, placed upon the inner or outer side of the said part D. The plates D may have holes formed through them, or prongs formed upon them, to enable them to be further secured by sewing or clinching, if desired.

The stud F is placed at such a distance from the stud C that the link E, hinged to said stud C, may be turned down upon the said stud F, and held in place by its head.

Any desired form or design may be given to the device to make it ornamental, or better adapt it to the use for which it is intended. The studs may also be provided with spring-catches, if desired, to hold the link in place.

In using the device, the link E is passed up through a hole in the upper part A, and is then turned down over the stud E, fastening the two parts A B securely and smoothly together.

Having thus described my invention, I claim as new and desire to secure by Letters Patent—

A fastening for shoes, &c., consisting of base-plate D, with the hinge-stud C and catch-stud F, rising therefrom, and link E, attached to stud C, all substantially as shown and described, and for the purpose stated.

CHARLES L. MOREHOUSE.

Witnesses:
C. SEDGWICK,
JAMES T. GRAHAM.